Figure 1:
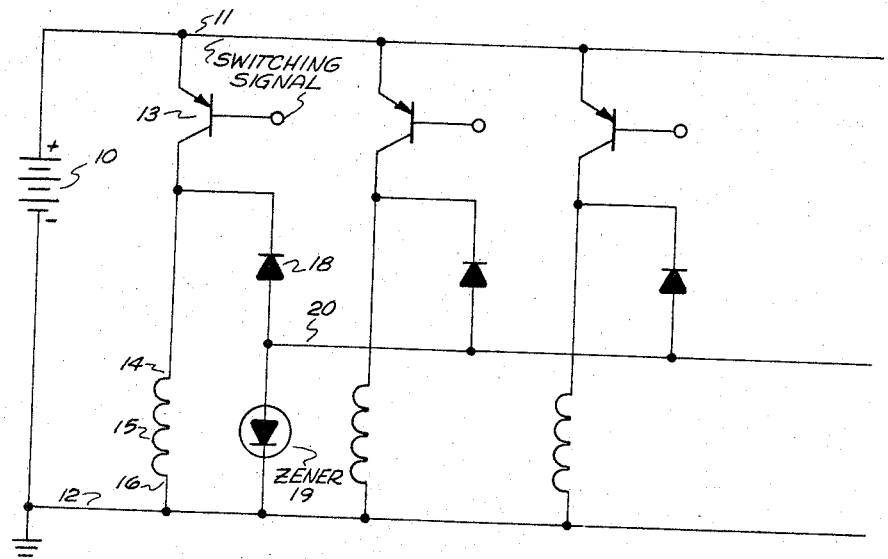

Sept. 5, 1967  C. SINCLAIR  3,340,407
DEENERGIZING CIRCUIT
Filed July 29, 1964

INVENTOR.
CARTER SINCLAIR
BY James G. Williams
HIS ATTORNEY

United States Patent Office 3,340,407
Patented Sept. 5, 1967

3,340,407
DEENERGIZING CIRCUIT
Carter Sinclair, Waynesboro, Va., assignor to General
Electric Company, a corporation of New York
Filed July 29, 1964, Ser. No. 386,015
5 Claims. (Cl. 307—101)

The invention relates to a deenergizing circuit, and particularly to a deenergizing circuit for a plurality of inductive loads.

Inductive loads are frequently used in electrical circuits to perform desired functions. For example, relay coils or solenoids may be energized with direct current source voltage by respective switching devices such as transistors. When an energized coil is deenergized, the energy in its magnetic field attempts to maintain the current flow which existed prior to deenergization. This energy has been dissipated by known deenergizing circuits that provide an external current path for the coil. The time required to dissipate the energy in the coil is inversely proportional to the magnitude of the resistance of the external current path. Thus, a high resistance current path dissipates the coil energy relatively rapidly. Since the energy in the magnetic field of the coil attempts to maintain the current flow which existed prior to deenergization, the product of this current flow and the resistance of the current path determines the maximum coil voltage at deenergization. This coil voltage, either alone or with the source voltage, may be applied to the circuit elements. Therefore, the resistance of the current path should be selected so that the voltage limitations of the various circuit elements, particularly the switching transistors, are not exceeded. But if the resistance of the current path is a linear resistor, the rate of dissipation of the coil energy decreases with time so that the coil current decays exponentially. This exponential current decay may permit coil current to hold the associated armature or contacts in an operated position for an undesirably long time. This situation has been improved by circuits that provide an external current path having a constant voltage device such as a Zener diode and a blocking diode. The Zener diode permits the maximum coil voltage to be limited to a desired magnitude and, because of its constant voltage characteristic, also dissipates the coil energy and current more rapidly than an impedance such as a linear resistor. But if there are a large number of coils which must each be provided with such an external current path, the relatively high cost of the needed Zener diodes becomes significant.

Therefore, an object of the invention is to provide a deenergizing circuit that has a single constant voltage device that can be used with a plurality of coils.

Another object of the invention is to provide an improved deenergizing circuit for a plurality of inductances.

Another object of the invention is to provide a multi-inductance deenergizing circuit that requires only a single constant voltage device.

Another object of the invention is to provide an improved deenergizing circuit that utilizes a single Zener diode which is coupled to a plurality of coils to be deenergized, and which presents a substantially constant voltage drop to one or more deenergized coils.

The deenergizing circuit of the invention is utilized with a plurality of inductances or coils that are supplied with direct current by switching devices that respectively couple the coils to the source of direct current. In accordance with the invention, one terminal of a single Zener diode is coupled to one end of each of the coils. The other terminal of the Zener diode is respectively coupled through conventional diodes to the other end of each of the coils. The Zener diode and the conventional diodes are poled so that they provide a current path from the negative side of the coils relative to the direct current source forwardly through the conventional diodes and reversely or in the breakdown direction through the Zener diode to the positive side of the coils relative to the direct current source; or from the negative side of the coils reversely through the Zener diode and forwardly through the conventional diodes to the positive side of the coils. In either case, the single Zener diode provides a constant voltage device for one or more of the coils that are deenergized.

Figure 2:
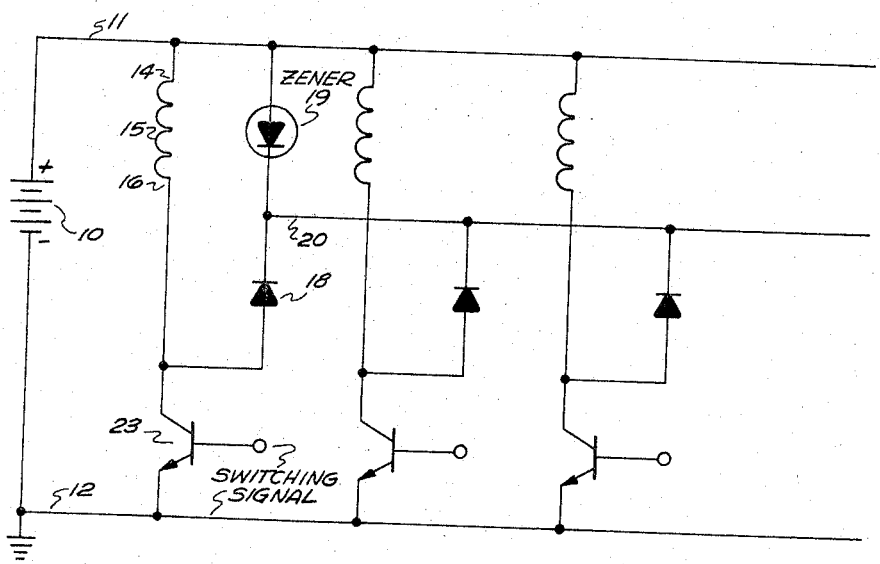

The invention is particularly pointed out in the claims. The invention may be better understood from the following description given in connection with the accompanying drawing in which:

FIGURE 1 shows a circuit diagram of a preferred embodiment of the invention for deenergizing three coils; and FIGURE 2 shows a circuit diagram of a modification of the diagram of FIGURE 1.

In FIGURE 1, there are shown three inductive loads, such as relay coils which are to be selectively operated or energized by a source of direct current 10. These coils have associated contacts or armatures which perform some function in response to respective coils being energized. For example, the coil armatures may print letters or characters in response to their respective coils being energized. Each of the coils is energized and deenergized in response to the conductive state of a transistor coupled in series with each coil and coupled to the source of direct current. For clarity, only three coils and associated elements have been shown, but more or less coils and elements may be used. Also for clarity, only one coil and associated elements have been given reference numerals.

The positive terminal of the direct current source 10 is coupled to a positive bus 11 and the negative terminal of the source 10 is coupled to a negative bus 12. The negative bus 12 may be coupled to ground or a reference point as indiacted. A PNP type transistor 13 has its emitter coupled to the positive bus 11 and its collector coupled to the normally positive (i.e., when energized) end 14 of a coil 15. The normally negative (i.e., when energized) end 16 of the coil 15 is coupled to the negative bus 12. (The designations of the positive and negative ends 14, 16 are based on coil polarities present when energization current flows from the positive bus 11 downward through the coil 15 to the negative bus 12.) A Zener diode 19 has its cathode coupled to the negative bus 12 and its anode coupled to a common bus 20. The Zener diode is known in the art, and provides forward current from anode to cathode in response to a relatively low forward voltage, and provides reverse current from cathode to anode in response to a relatively high reverse breakdown voltage. The Zener diode maintains its breakdown voltage for a wide range of currents, and hence serves as a constant voltage device. Zener diodes may have predetermined breakdown voltages of various magnitudes. A further description of Zener diodes may be found in the book entitled "Silicon Zener Diode and Rectifier Handbook," second edition, 1961, published by Motorola, Inc., Pheonix, Ariz. Again with reference to FIGURE 1, the common bus 20 is respectively coupled through a conventional diode rectifier 18 to the positive end 14 of each coil 15. It will be noted that only one Zener diode 19 is provided for the three coils shown. But more or less coils, each with its respective transistor and conventional diode, may be coupled to the positive bus 11, the negative bus 12, and the common bus 20.

When a relay coil 15 is to be energized, a negative-going signal is applied to the base relative to the emitter of its respective transistor 13 so that the transistor 13 can conduct. Current then flows from the positive bus 11, through the emitter-collector path of the transistor 13, and through the coil 15 from the positive end 14 to the negative end 16 and the negative bus 12. No current flows through the Zener diode 19 because any such current is blocked by the conventional diode 18. When the coil 15 is to be deenergized, a positive going signal is applied to the base relative to the emitter of the transistor 13. This stops current from flowing from the positive bus 11 through the emitter-collector path of the transistor 13 so that the coil 15 no longer receives current from the direct current source 10. However, because of the inductance present in the coil 15, the coil 15 attempts to maintain the current which existed prior to deenergization. In order to do this, the normally negative end 16 of the coil 15 becomes positive and the normally positive end 14 of the coil 15 becomes negative. If the voltage magnitude between the ends 14, 16 of the coil 15 exceeds the breakdown or reverse voltage characteristic of the Zener diode 19, current then flows from the normally negative end 16 reversely through the Zener diode 19, and forwardly through the conventional diode 18 to the normally positive end 14 of the coil 15.

Since the Zener diode 19 has a fixed voltage breakdown, this breakdown voltage magnitude plus the voltage magnitude of the source 10 determines the total voltage magnitude applied to the transistor 13. Thus, the total voltage magnitude applied to the transistor 13 can be determined and fixed. In an embodiment actually built and tested, the source 10 had a voltage of 28 volts and the Zener diode 19 had a breakdown voltage of 24 volts. Thus, when a coil 15 was deenergized, the associated transistor 13 was subjected to a total of 52 volts between its emitter and collector. Therefore, transistors 13 having an emitter-collector rating of 60 volts were selected to operate in that embodiment. And because the Zener diode 19 has a constant voltage drop for varying magnitude of current, the current produced by deenergization of the coil 15 is dissipated very quickly so that the current is reduced to a value which causes the associated contacts or armature to drop out or resume a normally deenergized position very quickly.

It will thus be seen that the deenergizing circuit of FIGURE 1 provides all of the advantages of a Zener diode for each relay coil or inductance used but only requires one Zener diode for all such coils and one conventional diode rectifier for each coil. Thus, the saving of additional Zener diodes is provided by the deenergizing circuit of the invention.

FIGURE 2 shows a circuit diagram of another embodiment of the invention. In FIGURE 2, the same reference numerals have been used to refer to the same elements and circuit parts. FIGURE 2 differs from FIGURE 1 in that the relative positions of the coil 15 and the transistor 13 have been reversed. This requires that the relative positions of the Zener diode 19 and the conventional diode 18 also be reversed. Also, each of the PNP type transistors 13 in FIGURE 1 have been replaced by an NPN type transistor 23 in FIGURE 2. The transistor 23 is turned on by a positive-going signal applied to its base relative to its emitter, and is turned off by a negative-going signal applied to its base relative to its emitter. When a coil 15 in FIGURE 2 is deenergized, current first flows through the conventional diode 18 and then the Zener diode 19 instead of first flowing through the Zener diode 19 and then the conventional diode 18 as in FIGURE 1.

It will thus be seen that the invention provides a novel and improved deenergizing circuit which requires only a single Zener diode for a plurality of coils which are to be deenergized and which further requires one conventional diode for each coil to be deenergized. Thus, all of the advantages of a Zener diode with its inherent voltage limiting characteristic and rapid dropout feature are provided but only one such Zener diode is required for a plurality of coils. The only limiting factor is the current-carrying capability of the Zener diode with respect to the number of coils which will be deenergized at any one time. If only one coil is to be deenergized at any one time, as would normally be the case, then the current-carrying capability of the Zener diode may be relatively small. And while the invention has been shown in only two embodiments, other embodiments are possible. For example, NPN type transistors may be used in place of the PNP type transistors shown in FIGURE 1, and the PNP type transistors may be used in place of the PNP type transistors in FIGURE 2. Of course, appropriate energizing and deenergizing signals should be provided for the type of transistors used. Also, other types of voltage reference devices may be used in place of the Zener diode. Therefore, while the invention has been described with reference to particular embodiments, it is to be understood that modifications may be made without departing from the spirit of the invention or from the scope of the claims.

What I claim as new and desire to secure by Letters Patent of the United States is:

1. In a circuit comprising a source of direct current, a plurality of inductances each of which has one end coupled to one side of said source, and a plurality of selectively operable switching devices respectively coupled between the other ends of said inductances and the other side of said source, the improvement comprising a voltage reference device having one end coupled to said one ends of all of said inductances, and a plurality of rectifier devices respectively coupled between said other ends of said inductances and the other end of said voltage reference device, said rectifier devices being poled to conduct current produced by their respective inductances when deenergized.

2. In a circuit having a plurality of inductances each having one side coupled to the positive terminal of a source of unidirectional potential, the other side coupled to the negative terminal of said source of unidirectional potential, and a respective and selectively operable switching device in series with each of said inductances, the improvement comprising a plurality of rectifier devices each having an anode and a cathode, means respectively coupling said cathodes to one side of said inductances, a first line coupled to all of said anodes, a second line coupled to all of said other sides of said inductances, and a voltage reference device coupled between said first and second lines to conduct current from said second line to said first line in response to the voltage of said second line being positive relative to the voltage of said first line by a predetermined magnitude.

3. In a circuit having a plurality of inductances each having one side coupled to the positive terminal of a source of unidirectional potential, the other side coupled to the negative terminal of said source of unidirectional potential, and a respective and selectively operable switching device in series with each of said inductances, the improvement comprising a plurality of rectifier devices each having an anode and a cathode, means respectively coupling said anodes to said other sides of said inductances, a first line coupled to all of said cathodes, a second line coupled to all of said one sides of said inductances, and a voltage reference device coupled between said first and second lines to conduct current from said first line to said second line in response to the voltage of said first line being positive relative to the voltage of said second line by a predetermined magnitude.

4. In a circuit having a plurality of inductances each having one side coupled to the positive terminal of a source of unidirectional potential, the other side coupled to the negative terminal of said source of unidirectional potential, and a respective and selectively operable switching device in series with each of said inductances, the improvement comprising a plurality of rectifier devices each having an anode and a cathode, means respectively coupling said cathodes to said one sides of said inductances, a first line coupled to all of said anodes, a second line coupled to all of said other sides of said inductances, and a Zener diode having an anode and cathode respectively coupled to said first and second lines to conduct current from said second line to said first line in response to the voltage of said second line being positive relative to the voltage of said first line by a predetermined magnitude.

5. In a circuit having a plurality of inductances each having one side coupled to the positive terminal of a source of unidirectional potential, the other side coupled to the negative terminal of said source of unidirectional potential, and a respective and selectively operable switching device in series with each of said inductances, the improvement comprising a plurality of rectifier devices each having an anode and a cathode, means respectively coupling said anodes to said other sides of said inductances, a first line coupled to all of said cathodes, a second line coupled to all of said one sides of said inductances, and a Zener diode having an anode and cathode respectively coupled to said second and first lines to conduct current from said first line to said second line in response to the voltage of said first line being positive relative to the voltage of said second line by a predetermined magnitude.

References Cited
UNITED STATES PATENTS

| | | | |
|---|---|---|---|
| 2,925,491 | 2/1960 | Hoeppner | 317—137 |
| 3,047,742 | 7/1962 | Greening | 307—88.5 |
| 3,056,906 | 10/1962 | Peters | 317—137 X |
| 3,222,575 | 12/1965 | Dexter | 317—20 X |
| 3,258,603 | 6/1966 | Wright | 307—94 X |
| 3,261,980 | 7/1966 | McCartney | 323—9 X |

ORIS L. RADER, *Primary Examiner.*

T. J. MADDEN, *Assistant Examiner.*